United States Patent
Kumazawa et al.

(10) Patent No.: US 7,120,159 B2
(45) Date of Patent: Oct. 10, 2006

(54) APPARATUS AND METHOD FOR PACKET TRANSMISSION

(75) Inventors: Masayuki Kumazawa, Fukuoka-Ken (JP); Mikio Shimazu, Fukuoka-Ken (JP); Yuji Shimizu, Koga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 959 days.

(21) Appl. No.: 10/047,437

(22) Filed: Oct. 23, 2001

(65) Prior Publication Data

US 2002/0114340 A1    Aug. 22, 2002

(30) Foreign Application Priority Data

Oct. 30, 2000    (JP)    ............................. 2000-329912

(51) Int. Cl.
 *H04L 12/56*    (2006.01)
(52) U.S. Cl. .................. 370/412; 370/229; 370/395.42
(58) Field of Classification Search ........... 370/395.42, 370/415, 237
See application file for complete search history.

(56) References Cited

U.S. PATENT DOCUMENTS

| 6,493,315 | B1* | 12/2002 | Simpson et al. ............ 370/229 |
| 6,577,596 | B1* | 6/2003 | Olsson et al. ............... 370/230 |
| 6,628,609 | B1* | 9/2003 | Chapman et al. ........... 370/229 |
| 6,678,244 | B1* | 1/2004 | Appanna et al. ............ 370/229 |

FOREIGN PATENT DOCUMENTS

JP    10013463    1/1998

\* cited by examiner

*Primary Examiner*—Hassan Kizou
*Assistant Examiner*—Mohammad S. Adhami
(74) *Attorney, Agent, or Firm*—Darby & Darby

(57) ABSTRACT

A packet transmission apparatus transfers arriving packets directly to a highest-priority queue under non-congestion conditions, and classifies the priority of a packet only on the existence of congestion. In one embodiment, non-congestion is determined when all queues are empty. In another embodiment, congestion or non-congestion is determined by upper and lower thresholds on the total number of packets in all queues. The ability to omit classifying incoming packets in the non-congestion condition improves processing speed, and eliminates the need for re-queuing or packet-replacing operations.

16 Claims, 7 Drawing Sheets

APPARATUS AND METHOD FOR PACKET TRANSMISSION

BACKGROUND OF THE INVENTION

1. Field of the Invention

The present invention relates to a packet transmission apparatus for transmitting packets using a plurality of queues and relates to a method therefor.

2. Description of the Related Art

This type of packet transmission apparatus has various forms, such as routers, switches, or boards that perform those main functions. WFQ (Weighted Fair Queuing) is most generally used as a scheduling method in this type of packet transmission apparatus. According to WFQ, band control is carried out for each priority class. In this method, queues corresponding to the number of priority classes are prepared, packets are transmitted according to a weight that has been set for each priority class. Thereby band assurance is offered.

In WFQ, when a packet arrives, a priority class is determined from the header of the packet. The packet is queued in a queue corresponding to the priority. A time stamp is given to the first packet of each queue. The packet having the smallest time stamp value (the oldest packet in the queue) is selected as the packet to be transmitted.

Therefore, (1) if the number of queues is n, then the calculation of O (log n) is required to determine a minimum value. Further, (2) even in the case where the number of packets is so small that processing according to priority is not needed, processing-overheads are large because a classification is made based on priority with respect to queues.

Accordingly, in order to realize higher-speed processing, Japanese Unexamined Patent Publication No. Hei-10-13463 discloses the following technique. A preferential flag is kept on with respect to a preferential packet both in a non-congestion state and in a congestion state. In the congestion state (i.e., in the state where a queue length has reached a threshold), the preferential flag extracts the on-packet so as to again queue it at a special queue corresponding to congestion, and preferentially transmits the packet queuing at the special queue corresponding to congestion.

As a result, FIFO (First In First Out) is realized in the non-congestion state. Therefore higher processing speed is achieved than is possible with WFQ.

However, if this technique is applied, the following disadvantages will arise.

(1) The classification by priority of packets that have arrived is regularly needed. Additionally, there is a need to operate preferential flags on the basis of the results of the classification. Therefore, time loss because of the classification is unavoidable even in the non-congestion state.

(2) Further, in the congestion state, since there is a need to extract flags that are in an ON-state with reference to the preferential flag of each packet and carry out re-queuing (i.e., replacement of a large amount of packets), a processing burden enormously increases. Additionally, in the congestion state in which the space for queues is almost full, if such burdened processing as above is carried out in addition to the processing of the packets that have arrived, there might arise a fear that the arriving packets cannot be processed in time, and therefore a malfunction, such as packet loss, is invited.

OBJECTS AND SUMMARY OF THE INVENTION

It is therefore an object of the present invention to provide a packet transmission apparatus that improves processing speed and that does not require packet-replacing operations, and to provide a method therefor.

According to a first aspect of the present invention, packets that have arrived are received and transmitted using of a plurality of queues. A classifying device transfers packets that have been input to any one of the plurality of queues in accordance with packet priority. In a non-congestion state, classification made by the classifying device is omitted, and the received packets are alternatively and directly transferred to any one of the plurality of queues.

With this structure, the classification made by the classifying device is omitted, and the received packets are alternatively and directly (i.e., without passing through the classifying device) transferred to any one of the plurality of queues in the non-congestion state. Therefore, the processing speed is improved. Further, in the congestion state, packets are transferred to a queue corresponding to packet priority by means of the classifying device. In the congestion state, packets are transmitted while reflecting the packet priority. In case of a shift from the non-congestion state to the congestion state or a shift from the congestion state to the non-congestion state, the replacement of packets among the plurality of queues is unnecessary. Therefore the processing burden is reduced.

Either in the non-congestion state or in the congestion state, the operation of preferential flags is unnecessary. Accordingly, the processing speed is increased over that of the prior art, and there is no need to secure a region for the preferential flags in a packet. It should be noted that what is required for the packet priority is that the priority is classified by some form (destination address or sender address, for example), and there is no need to secure a region used to store only the priority in a packet.

According to a second aspect of the present invention, when packets are transmitted, the priority as to a plurality of queues is referenced, and a packet is transmitted from a queue having a higher priority.

With this structure, packets are transmitted in order of queue priority. Therefore, rational packet transmission is carried out.

According to a third aspect of the present invention, in a non-congestion state, a received packet is transferred directly to a queue having the highest priority among a plurality of queues.

With this structure, since the received packet is transferred directly to the queue having the highest priority, high-speed processing without classification is realized. In addition, FIFO transmission is basically carried out only on the queue having the highest priority. This further increases the processing speed. Additionally, since the transmission is carried out only on the queue having the highest priority, scheduling is substantially omitted.

According to a fourth aspect of the present invention, when the length of the queue having the highest priority among the plurality of queues exceeds a fixed threshold, processing reverts to processing of the congestion state.

With this structure, since the processing stage moves to the processing of the congestion state when the length of the queue having the highest priority among the plurality of queues becomes a fixed threshold or above, the queues are prevented from overflowing.

According to a fifth aspect of the present invention, the priority as to the plurality of queues is regularly constant. When all of the queues become empty, the processing stage moves to the processing in the non-congestion state.

With this structure, since the priority as to the plurality of queues is regularly constant, packets are transmitted through simple processing. Additionally, since the processing stage moves to the processing of the non-congestion state when all of the queues become empty, it is absolutely assured that all packets are transmitted.

According to a sixth aspect of the present invention, when the entire queue length of all of the plurality of queues is at or below a fixed threshold, the priority of a queue among the plurality of queues that has had the highest priority before being switched is switched to the lowest priority, and, in this state, when all the queues except the queue having the lowest priority are empty, the step moves to the processing in the non-congestion state.

With this structure, a shift to the non-congestion state is made early even if all queues are not emptied. The opportunity of omitting classification by the classifying device is improved. Accordingly, the processing speed is improved.

According to a seventh aspect of the present invention, when a shift is made from the congestion state to the non-congestion state, the priorities of the plurality of queues are returned to the state that existed before being switched.

With this structure, when a shift is made from the congestion state to the non-congestion state, the priorities of the plurality of queues are returned to the state before being switched. Thereby preparation is made for the next shift to the congestion state.

According to an eighth aspect of the present invention, in a state in which the priorities of a plurality of queues have been switched, a received packet is transferred directly to a queue having the lowest priority among the plurality of queues.

With this structure, the transmission of packets remaining in the queues having higher priorities is promoted.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
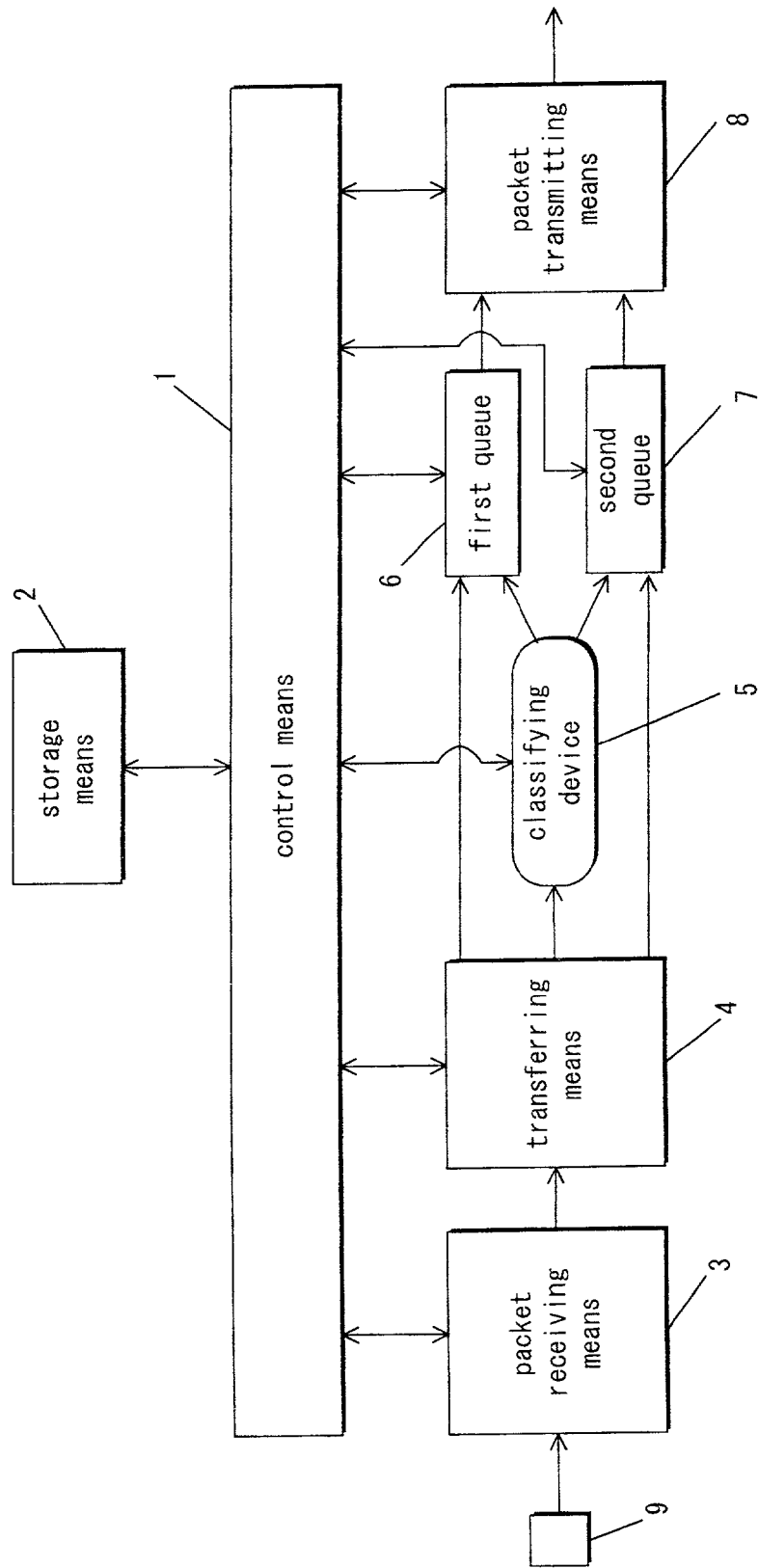
FIG. 1 is a block diagram of a packet transmission apparatus according to an embodiment of the present invention.

Referring to FIG. 1, a control means 1 controls the entire apparatus. A storage means 2 includes the following:

a) a region used to store information about a congestion flag that indicates congestion/non-congestion (ON is congestion, and OFF is non-congestion), b) priority of each queue (in this example, "1" is preferential, and "2" is non-preferential), c) a queue length of each queue, d) destinations (first queue/second queue/classifying device) by a transferring means described later, e) thresholds (Th1, Th2), f) a switching flag (absence/presence), g) information about a program executed by the control means 1.

A packet receiving means 3 receives an arriving packet 9. A transferring means 4 receives the packet received by the packet receiving means 3, and transfers the packet to a destination appointed by the control means 1. As mentioned above, the destination of a packet transferred by the transferring means 4 is alternatively selected from among the first queue 6, the second queue 7, and a classifying device 5.

The classifying device 5 sees the contents of, for example, a header of a packet to check packet priority, and then transfers the packet to a queue (i.e., either the first queue 6 or the second queue 7) having a corresponding priority. As mentioned above, the packet priority has no requirement except that the priority must be classified in some manner (destination address or sender address, for example). The header of the packet is not necessarily required to secure a region used to store only the priority in the packet.

The queue priority is determined so that one of the first queue 6 or second queue 7 is higher in priority (priority=1). The other queue is lower in priority (priority=2). In the present invention, since the packets located in the first queue 6 and second queue 7 are not subjected to rearrangement (re-queuing) from the outside, the packets in both the first queue 6 and the second queue 7 are infallibly transmitted by FIFO.

The present invention is not limited to the example shown by the figure in which only the two queues are used. Three or more queues may be used.

A packet transmitting means 8 checks the priorities of the first queue 6 and second queue 7. If any packets remain in the queue having a higher priority, the packet transmitting means 8 always extracts the packets from the queues having the higher priority and transmits them. On the other hand, if there is no packet in the queues having the higher priority, the packet transmitting means 8 extracts packets from queues having a lower priority and transmits them.

Embodiment 1

Figure 2:
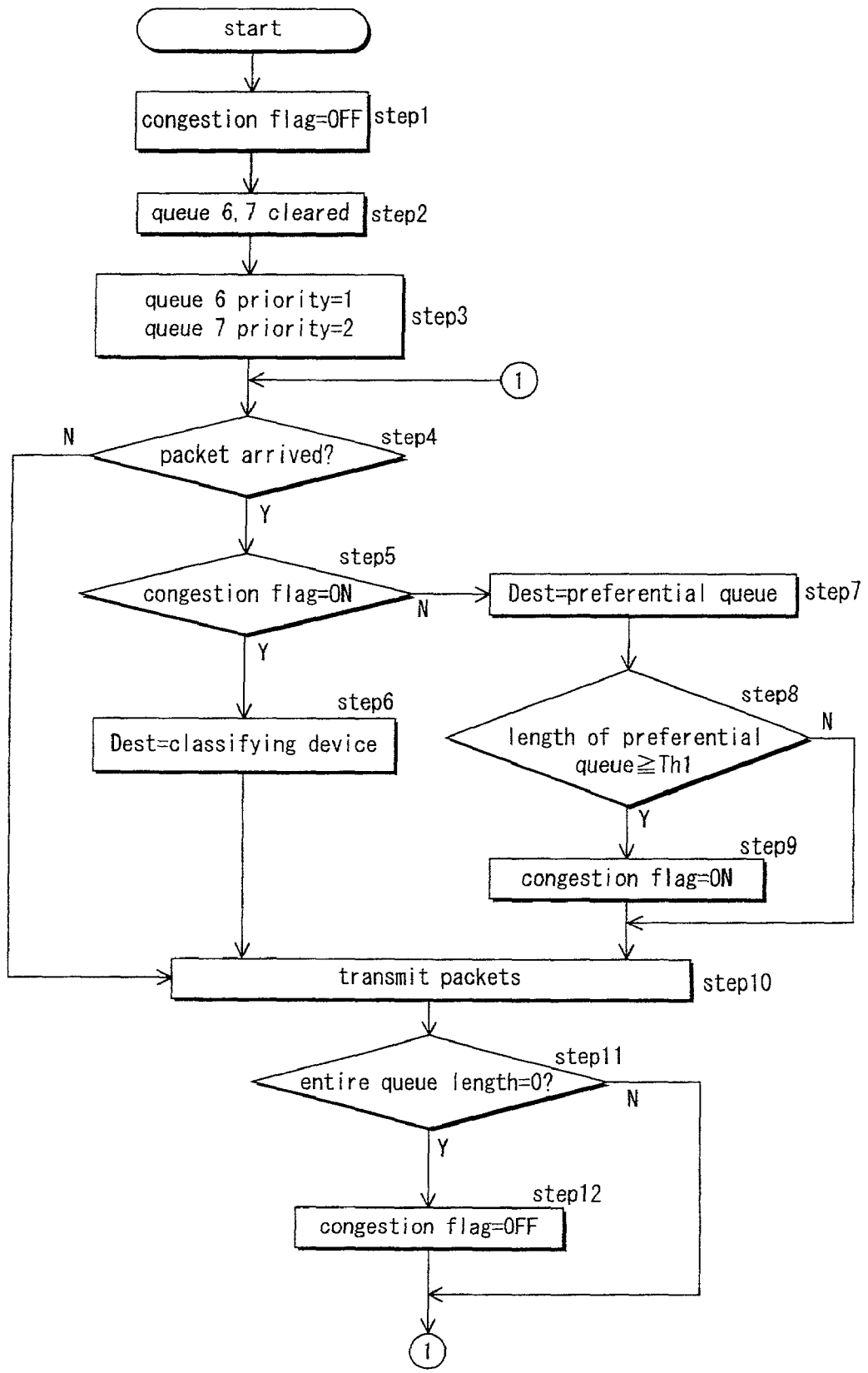
FIG. 2 is a flowchart of Embodiment 1 of the present invention.

Processing in Embodiment 1 is hereinafter described with reference to the flowchart of FIG. 2.

First, when operations start, the control means 1 carries out pre-processing in steps 1 through 3. The control means 1 turns off a congestion flag in step 1, and clears and empties the first queue 6 and the second queue 7 in step 2. In step 3, the control means 1 sets the priority of the first queue 6 to "1" (preferential), and sets the priority of the second queue 7 to "2" (non-preferential).

Thereafter, the control means 1 checks whether or not the packet receiving means 3 has received an arriving packet in step 4. If not received, the processing stage moves to step 10. If received, the processing stage moves to step 5.

In step 5, the control means 1 checks whether the congestion flag is on or off. If the congestion flag is on, the control means 1 sets the destination at the "classifying device" in step 6, and the processing stage moves to step 10. If the congestion flag is off, the control means 1 sets the destination of the transferring means 4 at the "preferential queue (herein, the first queue 6)" in step 7.

Since a received packet is transferred directly to the preferential queue at this time, the processing speed is improved by omission of the classification made by the classifying device 5.

In step 8, the length of the preferential queue (herein, the queue length of the first queue 6) is compared with a first threshold TH1. If the preferential-queue length is greater than the first threshold TH1, the control means 1 turns on the congestion flag in step 9, and the processing stage moves to step 10. If not, the control means 1 leaves the congestion flag as it is, and the processing stage moves to step 10.

Immediately after the beginning of the operations, the congestion flag is turned off in step 1, and all queues 6 and 7 are cleared in step 2, and therefore the processing stage follows steps 5, 7, 8, and 10 in this order.

In step 10, the packet transmitting means 8 transmits packets. That is, the packet transmitting means 8 checks the priorities of the first queue 6 and second queue 7 as mentioned above. If packets remain in the queue (herein, the first queue 6) having a higher priority, the packet transmitting means 8 extracts the packets from the queue (herein, the first queue 6) having the higher priority, and transmits them.

On the other hand, if there is no packet in the queue (herein, the first queue 6) having a higher priority, the packet transmitting means 8 extracts packets from the queue (herein, the second queue 7) having a lower priority and transmits them.

Thereafter, in step 11, the control means 1 checks whether or not the sum total of the length of the first queue 6 and the length of the second queue 7 (i.e., the entire queue length) is zero. If the total length is zero, the control means 1 turns off the congestion flag in step 12, and the processing stage moves to step 4.

If the total length is not zero, the control means 1 leaves the congestion flag as it is, and the processing stage returns to step 4. Thereafter, the control means 1 repeats the processing subsequent to step 4 until the operations end.

Although this flowchart is for convenience of explanation wherein the packets are received and transmitted in the sequence of processings, the present invention is also applicable to a case in which the packets are asynchronously received and transmitted.

Referring now also to FIG. 3 through FIG. 9, a more detailed description is provided of an example of packet transmission in Embodiment 1.

Figure 3:
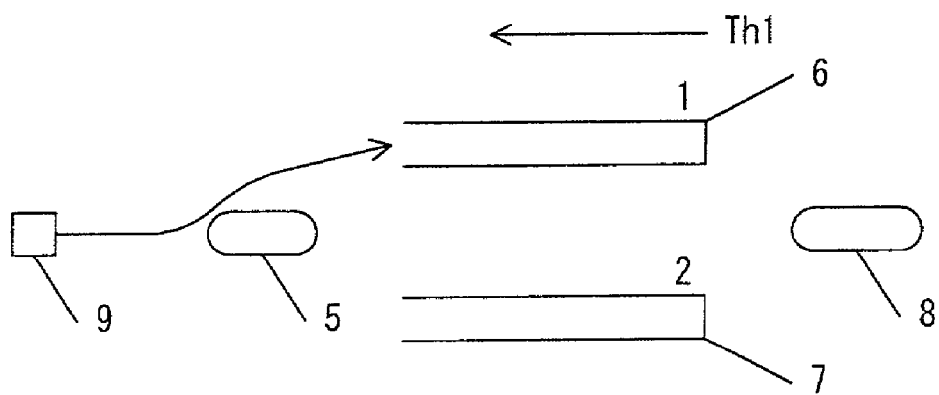
FIG. 3 through FIG. 9 are explanatory drawings for explaining the steps of Embodiment 1.

First, when operations start, the first queue 6 and the second queue 7 are empty as shown in FIG. 3 (step 2), and the packet receiving means 3 receives an arriving packet 9 (step 4).

Since the congestion flag is off at this time, the destination is a preferential queue (i.e., the first queue 6) (step 7). Therefore, the arriving packet 9 is transferred directly to the first queue 6 without undergoing classification by the classifying device 5.

Figure 4:
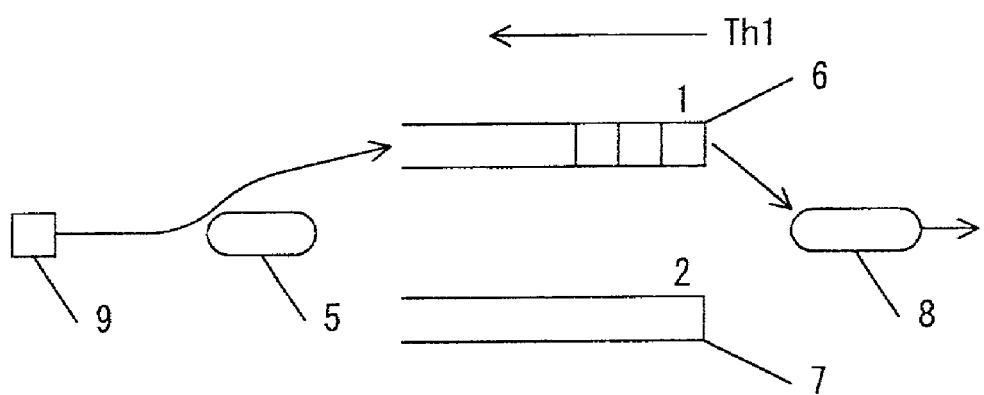

The successive transfer of the arriving packet 9 brings about the state of FIG. 4. In this example, three packets remain in the first queue 6, and the preferential-queue length (i.e., the queue length of the first queue 6) is the first threshold Th1 or below, and the non-congestion state continues. The next arriving packet 9 is still transferred directly to the first queue 6, and the packet transmitting means 8 transmits the packets in order of their arrival (i.e., firstly from the first queue 6).

Figure 5:
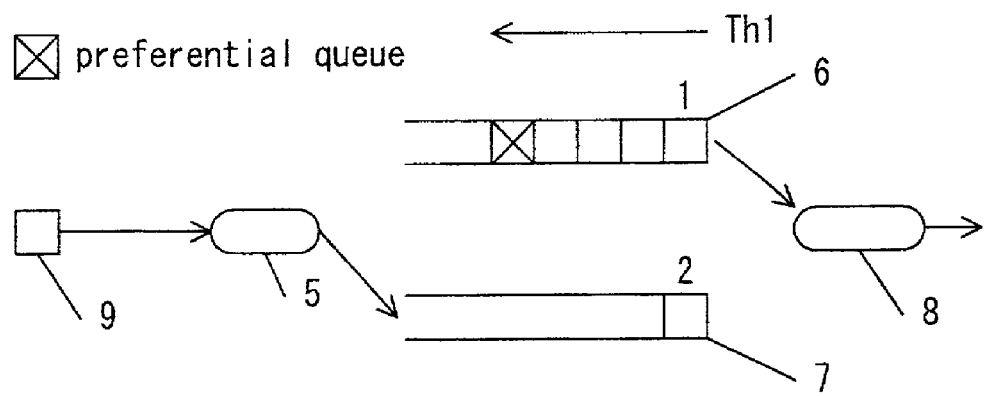

It is assumed that the preferential-queue length is equal to the first threshold Th1 when the arriving packet 9 is continuously transferred and thereby a preferential packet is transferred to the first queue 6 as shown in FIG. 5. Thereupon, the control means 1 carries out the processings of steps 8 and 9, and turns on the congestion flag so as to change from the non-congestion state to the congestion state and thus to change the destination of the arriving packet 9 to the classifying device 5 (step 6). As a result, the classifying device 5 begins a classification. Therefore, if the arriving packet 9 at this time is a non-preferential packet, this non-preferential packet avoids the first queue 6, which is congested with the packets, and enters the second queue 7 as shown in FIG. 5.

Figure 6:
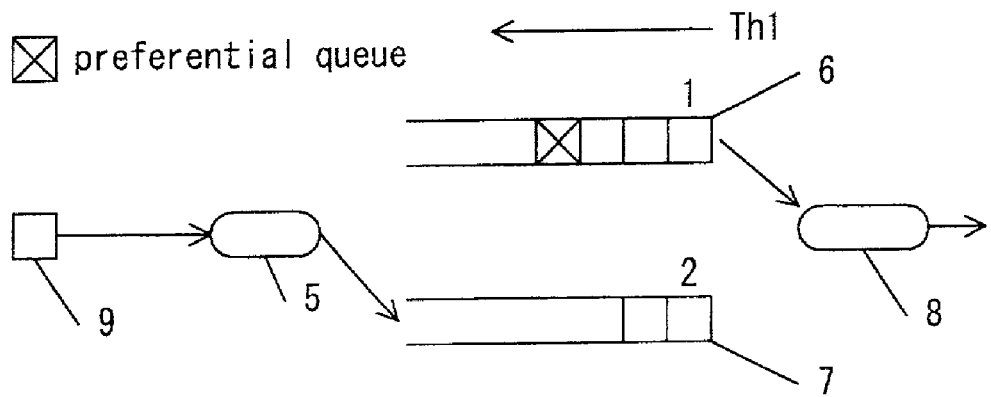

When the arriving packet 9 is further transferred, the packet transmitting means 8 transmits packets while continuing to give priority to the first queue 6 as shown in FIG. 6. Therefore the preferential-queue length (herein, the packet length of the first queue 6) is preferentially reduced.

Figure 7:
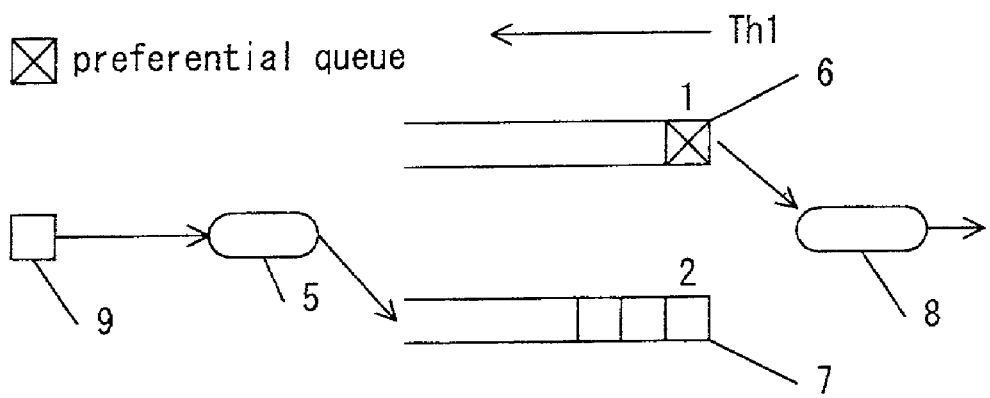

Accordingly, the preferential packet remaining in the preferential queue (herein, the first queue 6) is transmitted as shown in FIG. 7. The packet transmitting means 8 transmits the packets from the first queue 6 until the first queue 6 is emptied.

Figure 8:
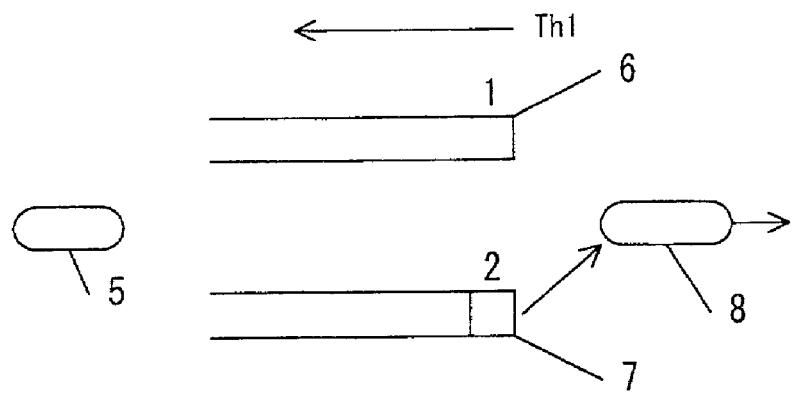
Figure 9:
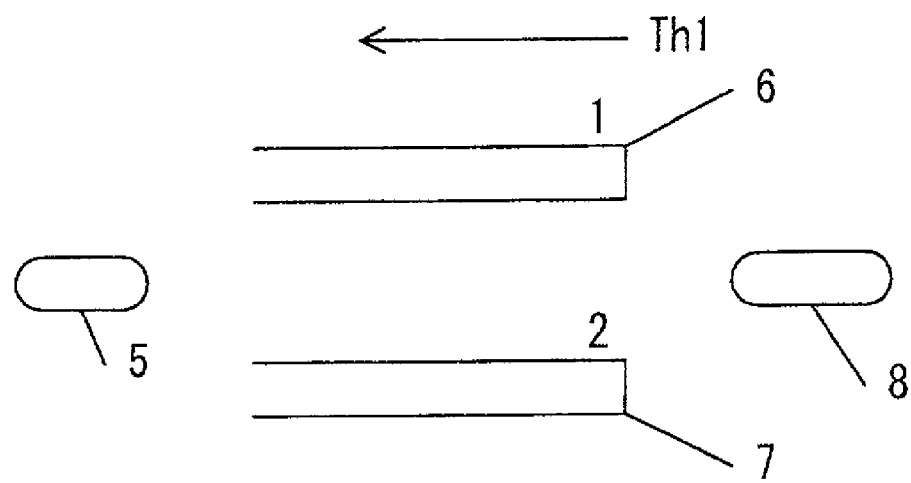

Thereafter, when the arriving packets 9 are numerically reduced and thereby the first queue 6 is emptied, the packets are transmitted from the non-preferential queue (herein, the second queue 7) as shown in FIG. 8. Finally, both the first queue 6 and the second queue 7 are emptied as shown in FIG. 9, and the total queue length becomes zero.

The condition of zero total queue length enables the control means 1 to judge that a shift to the non-congestion state has been made from steps 11 and 12, and turns off the congestion flag so as to return to the state of FIG. 3. A judgment about the non-congestion is formed in this way when the entire queue length becomes zero. This assures that all packets are infallibly transmitted. In this case, the transmission of the packets is first completed in the preferential queue, and then the packets are transmitted from the non-preferential queue.

Subsequently, the same or similar procedures as shown in FIG. 3 and in the related figures are repeatedly carried out.

Embodiment 2

Figure 10:
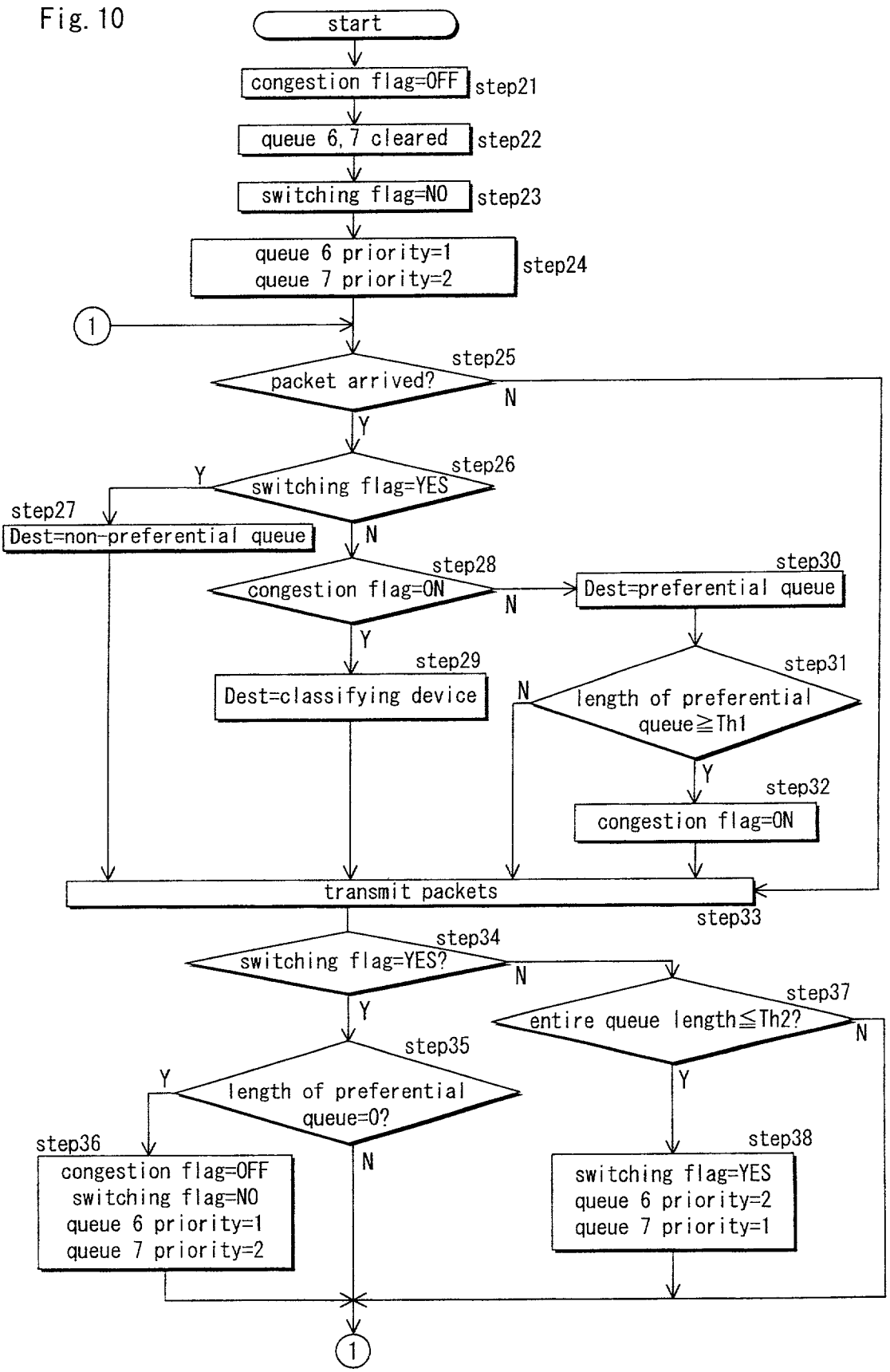
FIG. 10 is a flowchart of Embodiment 2 of the present invention.

Processing in Embodiment 2 is hereinafter described with reference to the flowchart of FIG. 10 and the process-explaining drawings of FIG. 11 through FIG. 13. Unlike in Embodiment 1, the priority of each queue is switched in Embodiment 2 when a predetermined condition is fulfilled. Although the switching of the queue priority inevitably makes the processing slightly more complex in this Embodiment than in Embodiment 1, an advantage resides in that a shift to the non-congestion state is carried out earlier so as to lengthen the time during which classification is omitted. This increases the processing speed.

First, when operations start, the control means 1 carries out pre-processing in steps 21 through 24. In step 21, the control means 1 judges that the present condition is a non-congestion state, and turns off the congestion flag. In step 22, the control means 1 clears and empties the first queue 6 and the second queue 7. In step 23, the control means 1 sets the switching flag at "NO" as a default. In step 24, the control means 1 sets the priority of the first queue 6 to "1" (preferential), and sets the priority of the second queue 7 to "2" (non-preferential).

Thereafter, in step 25, the control means 1 checks whether or not the packet receiving means 3 has received an arriving packet. If received, the processing stage moves to step 26. If not received, the processing stage moves to step 33.

In step 26, the control means 1 checks whether the switch flag is "YES" or "NO". If "YES", the control means 1 sets the destination at the "non-preferential queue" (step 27), and the processing stage moves to step 33. If "NO", the control means 1 checks whether the congestion flag is on or off in step 28. If on, the control means 1 sets the destination at the "classifying device" in step 29, and the processing stage moves to step 33. If off, the control means 1 sets the destination at the "preferential queue" in step 30, and the processing stage moves to step 31.

Since a received packet is transferred directly to the queue when step 27 or step 30 is followed, the processing speed is improved as a result of the omission of the classification by the classifying device 5.

Since packets do not gather in the preferential queue especially when step 27 is followed, packets remaining in the preferential queue are transmitted one after another, and thus the preferential-queue length is quickly shortened. As a result, a shift to the non-congestion state is carried out as early as possible.

In step 31, the preferential-queue length (i.e., the queue length of the first queue 6 when the switching flag is "NO", or the queue length of the second queue 7 when the switching flag is "YES") is compared with the first threshold Th1. If the preferential-queue length is greater than the first threshold Th1, the control means 1 turns on the congestion flag in step 32, and the processing stage moves to step 33. If not, the control means 1 leaves the congestion flag as it is, and the processing stage moves to step 33.

In step 33, the packet transmitting means 8 transmits packets. That is, as mentioned above, the priority of the first queue 6 and the priority of the second queue 7 are checked. If packets remain in the preferential queue (i.e., the first queue 6 when the switching flag is "NO", or the second queue 7 when the switching flag is "YES"), the packets are regularly extracted and transmitted from the preferential queue. On the other hand, if there is no packet in the preferential queue (i.e., the first queue 6 when the switching flag is "NO", or the second queue 7 when the switching flag is "YES"), the packet transmitting means 8 extracts and transmits packets from the queue having the lower priority (i.e., from the second queue 7 when the switching flag is "NO", or from the first queue 6 when the switching flag is "YES").

In step 34, referring to the switching flag, the control means 1 allows the processing stage to move to step 35 when this flag is "YES" and allows the processing stage to move to step 37 when the flag is "NO".

In step 35, the control means 1 checks whether or not the length of the preferential queue (i.e., the first queue 6 when the switching flag is "NO", or the second queue 7 when the switching flag is "YES") is zero. Herein, if the preferential-queue length is zero, the preferential queue is empty. If any packets remain, such remaining packets must only be those in the non-preferential queues.

Therefore, in step 36, the control means 1 turns off the congestion flag according to the judgment of the non-congestion, sets the switching flag to "NO", and returns the priority of the first queue 6 and the priority of the second queue 7 into the state prior to being switched. In other words, the priority of the first queue 6 is set to "1" (preferential), and the priority of the second queue 7 is set to "2" (non-preferential).

Herein, since a shift to the non-congestion state is carried out early, in spite of the fact that all queues are not empty, the time during which classification is omitted is lengthened, and the processing speed is improved. Additionally, since the priority of the queue is returned to the state it had before being switched, this prepares for a shift to the next congestion state. Thereafter, the control means 1 allows the processing stage to return to step 25.

On the other hand, in step 35, since packets still remain in the preferential queue if the preferential-queue length is not zero, the control means 1 maintains the congestion state until all of the packets are transferred, and allows the processing stage to move to step 25.

Thereafter, in step 37, the control means 1 checks whether or not the total sum of the length of the first queue 6 and the length of the second queue 7 (i.e., the entire queue length) is at or below the second threshold Th2. If not, the control means 1 allows the processing stage to move to step 25 without any processing.

On the other hand, if the entire queue length is at or below the second threshold Th2, the control means 1 sets the switching flag to "YES", sets the priority of the second queue 7 to "1" (preferential), and sets the priority of the first queue 6 to "2" (non-preferential) in step 38. In other words, the priority is reversed with respect to the state that existed before being switched. Thereafter, the control means 1 allows the processing stage to move to step 25.

Thereafter, the control means 1 repeats the processing of step 25 and the processings of the steps subsequent to step 25 until the operations end.

Although this flowchart is for convenience of explanation wherein the packets are received and transmitted in the sequence of processings, the present invention is also applicable to a case in which the packets are asynchronously received and transmitted.

Figure 11:
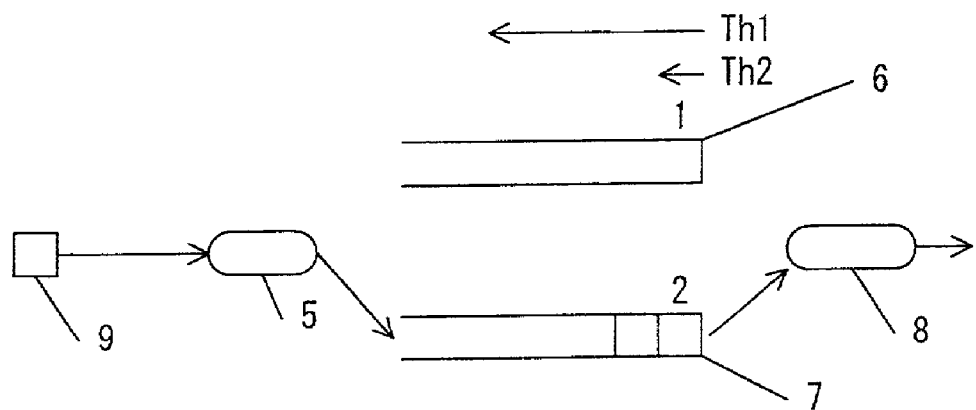
FIG. 11 through FIG. 13 are explanatory drawings for explaining the steps of Embodiment 2.
Figure 12:
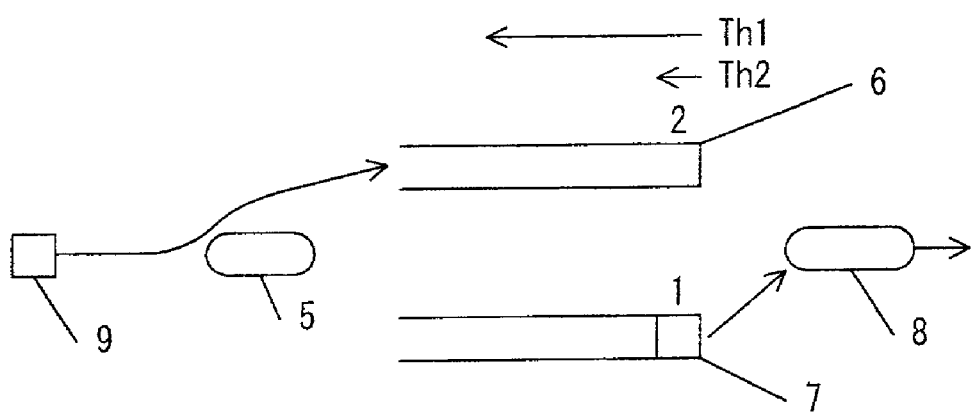
Figure 13:
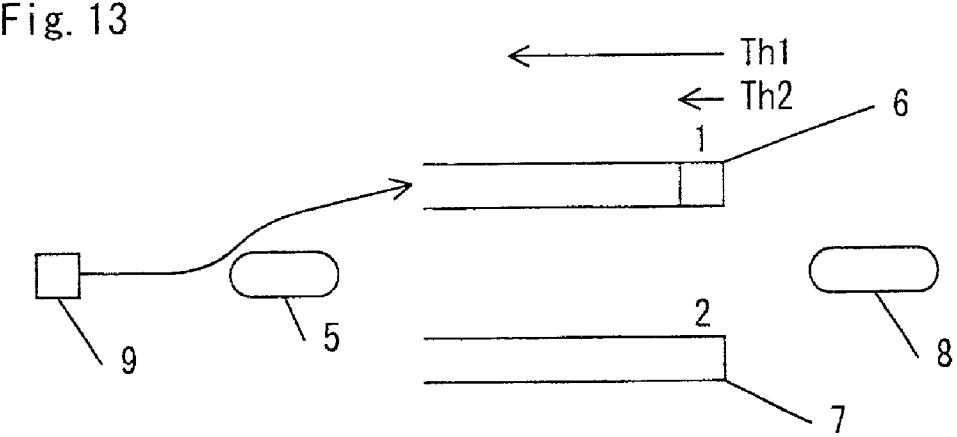

Next, referring to FIG. 11 through FIG. 13, a more detailed description is provided of an example of packet transmission in Embodiment 2. Almost the same steps as in Embodiment 1 are followed after the operations start in the non-congestion state until a shift to the congestion state is carried out. Therefore, in order to avoid a repetition of the same words, a description is given of a situation subsequent to the shift to the congestion state.

First, let us assume that a state shown by FIG. 11 has arisen. This shows a situation immediately after a shift to the congestion state is carried out. According to step 29, the destination of the transferring means 4 is the "classifying device". Further, let us assume that the switching flag is "NO", and the entire queue length is greater than the second threshold Th2.

Arriving packets 9 are transferred to the classifying device 5. Herein, since the packets the priority of each of which is lower are transferred, the packets that have been received previously are stored in the second queue 7.

Since the preferential queue (i.e., the first queue 6) is empty in this state, the packet transmitting means 8 transmits packets remaining in the non-preferential queue (i.e., the second queue 7) in step 33 (in FIG. 11, one of two packets is transmitted).

As a result of this transmission, a state shown by FIG. 12 is reached. In detail, the packet transmitting means 8 transmits one of the two remaining packets in FIG. 11, and thereby the entire queue length is equal to the second threshold Th2 (in this example, Th2=1).

Therefore, the processing stage proceeds from step "to step", and the switching flag is set to "YES". The priority of the first queue 6 is set at 2, and the priority of the second queue 7 is set at 1. That is, the priority is reversed with respect to the state before being switched. Thereafter, the processing stage moves to step 25.

As shown in FIG. 12, the packet receiving means 3 receives an arriving packet 9 at this time in step 25, and the switching flag is set to "YES" in step 26, and the processing stage moves to step 27.

Therefore, this arriving packet 9 is transferred to the first queue 6, which is presently a non-preferential queue, without entering the classifying device 5.

Since the packet transmitting means 8 transmits the remaining packets from the second queue 7, which is a preferential queue, at this time, the queue length of the preferential queue (i.e., the second queue 7) in this state becomes zero. Since the switching flag is "YES" at this time, the processing stage moves to step 34, step 35, and step 36, and the non-congestion state (congestion flag=off) is again reached. The switching flag is set to "NO", and the priority of the first queue 6 and the priority of the second queue 7 are returned to their states before being switched.

As a result, as shown in FIG. 13, the next arriving packet 9 is transferred directly to the first queue 6, which is a preferential queue restored through step 25, step 26, step 28, and step 30 without entering the classifying device 5.

If schedulers and queues are added besides the above-mentioned structure, even more detailed scheduling is carried out. At this time, either WFQ (Weighted Fair Queuing) or WRR (Weighted Round Robin) is acceptable for a scheduler method.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A packet transmission apparatus comprising:
a plurality of queues each having a different priority;
a packet transmitting unit operable to extract a packet from any one of said plurality of queues, thereby transmitting the extracted packet;
a packet receiving unit operable to receive a packet that has arrived;
a transferring unit operable to transfer the packet received at said packet receiving unit;
a classifying device operable to transfer the packet transferred from said transferring unit to any one of said plurality of queues in accordance with a priority of the packet transferred from said transferring unit; and
a controlling unit operable to judge whether said plurality of queues is in a congestion state or in a non-congestion state,
wherein said transferring unit is further operable to alternatively transfer the packet received by said packet receiving unit directly to any one of said plurality of queues in the non-congestion state and transfer the packet received by said packet receiving unit to said classifying device in the congestion state.

2. The packet transmission apparatus as set forth in claim 1, wherein said packet transmitting unit includes a referring unit operable to refer to a priority of each of said plurality of queues and a transmitting unit operable to transmit a packet from a queue having a higher priority.

3. The packet transmission apparatus as set forth in claim 1, wherein said transferring unit is further operable to transfer the packet received by said packet receiving unit directly to a queue having the highest priority among said plurality of queues in said non-congestion state.

4. The packet transmission apparatus as set forth in claim 1, wherein said controlling unit is operable to judge that said plurality of queues is in the congestion state when a queue length of a queue having the highest priority among said plurality of queues is at least a fixed threshold value.

5. The packet transmission apparatus as set forth in claim 1, wherein said controlling unit is further operable to judge that said plurality of queues is in the non-congestion state when the priority of each of said plurality of queues is regularly constant and all of said plurality of queues are empty.

6. The packet transmission apparatus as set forth in claim 1, wherein the control unit is further operable to switch a queue having a highest original priority among said plurality of queues to a lowest switched priority when the length of each of said plurality of queues does not exceed a fixed threshold, and to judge that said plurality of queues is in the non-congestion state when each of said plurality of queues except the queue having the lowest switched priority is empty.

7. The packet transmission apparatus as set forth in claim 6, wherein the control unit is further operable to return the priority of each of said plurality of queues to the original priority when the control unit transitions from the congestion state to the non-congestion state.

8. The packet transmission apparatus as set forth in claim 6, wherein, said transferring unit is further operable to transfer the packet received by said packet receiving unit directly to said queue having said lowest switched priority among said plurality of queues when the a priority of each of said plurality of queues is a switched priority.

9. A packet transmission method comprising:
establishing at least first and second queues, each queue having a different priority;
extracting a packet from at least one of the first and second queues, thereby transmitting the extracted packet;
receiving a packet that has arrived;
judging whether at least one of the first and second queues is in a congestion state or in a non-congestion state;
transferring alternatively the received packet directly to any one of the first and second queues in the non-congestion state; and
transferring the received packet to a classifying device and then to any one of the first and second queues by classifying the received packet in accordance with a priority of the packet in the congestion state.

10. The packet transmitting method as set fort in claim 9, further comprising:
referring to a priority of said at least first and second queues to determine a higher priority queue; and
transmitting packets from said higher priority queue.

11. The packet transmitting method as set forth in claim 9, wherein in a non-congestion state, directly transferring a received packet to a queue having a highest priority among said at least first and second of queues.

12. The packet transmitting method as set forth in claim 9, wherein said judging judges that said at least one of first queue and said second queue is in the congestion state when a queue length of a queue having a highest priority among said at least first and second queues contains at least a fixed threshold of packets.

13. The packet transmitting method as set forth in claim 9, wherein said judging judges the non-congestion state when all of said at least first and second queues are empty.

14. The packet transmitting method comprising:
establishing at least first and second queues; extracting a packet from at least one of the first queue and the second queue, thereby transmitting the extracted packet;
receiving a packet that has arrived;
judging whether at least one of the first queue and the second queue is in a congestion state or in a non-congestion state; and
transferring alternatively the received packet directly to any one of the first queue and the second queue in the non-congestion state, and transferring the received packet to any one of the first queue and the second queue by classifying in accordance with a priority of the packet in the congestion state; and
switching a priority of a queue having a highest priority prior to being switched to a lowest priority when an entire length of all of said at least first and second of queues does not exceed a fixed threshold, wherein when all queues except said queue having said lowest priority are empty in this state, said judging judges that at least one of said first queue and said second queue is in the non-congestion state.

15. The packet transmitting method as set forth in claim 14, wherein a priority of each of said at least first and second queues is returned to a state that existed before being switched when said judging judges the existence of a non-congestion state.

16. The packet transmitting method as set forth in claim 14, wherein in a state where a priority of each of said at least first and second queues has been switched, transferring a received packet directly to said queue having said lowest priority among said plurality of queues.

* * * * *